US005450243A

United States Patent [19]

Nishioka

[11] Patent Number: 5,450,243
[45] Date of Patent: Sep. 12, 1995

[54] IMAGING SYSTEM HAVING A BLURRING OPTICAL ELEMENT FOR MINIMIZING MOIRE PHENOMENON

[75] Inventor: Kimihiko Nishioka, Hachiouji, Japan

[73] Assignee: Olympus Optical Co., Ltd., Tokyo, Japan

[21] Appl. No.: 895,010

[22] Filed: Jun. 8, 1992

Related U.S. Application Data

[60] Division of Ser. No. 511,356, Apr. 12, 1990, Pat. No. 5,121,213, which is a continuation-in-part of Ser. No. 159,921, Feb. 24, 1988, abandoned.

[30] Foreign Application Priority Data

Feb. 25, 1987 [JP] Japan .................. 62-42429

[51] Int. Cl.6 .................. G02B 3/06; H04N 5/335
[52] U.S. Cl. .................. 359/710; 359/363; 348/340; 348/359; 348/360; 385/116; 385/117; 385/119
[58] Field of Search .................. 359/362–363, 359/656–661, 664, 724, 708, 710; 385/104, 117, 119, 116; 358/225, 213.11, 55; 348/335, 340, 360, 359

[56] References Cited

U.S. PATENT DOCUMENTS

| | | | |
|---|---|---|---|
| 3,927,254 | 12/1975 | Lessman | 358/225 |
| 4,178,611 | 11/1979 | Okano | 358/44 |
| 4,467,361 | 8/1984 | Ohno | 358/98 |
| 4,472,735 | 9/1984 | Shinozaki et al. | 358/47 |
| 4,554,585 | 11/1985 | Carlson | 358/209 |
| 4,626,897 | 12/1986 | Sato et al. | 358/44 |
| 4,663,661 | 5/1987 | Weldy et al. | 358/44 |
| 4,675,727 | 6/1987 | Sekizawa et al. | 358/55 |
| 4,858,002 | 8/1989 | Zobel | 358/225 |
| 4,870,496 | 9/1989 | Fantone | 358/225 |
| 4,895,138 | 1/1990 | Yabe | 128/6 |
| 4,898,457 | 2/1990 | Alexeev | 358/275 |
| 4,916,534 | 4/1990 | Takahashi | 358/225 |
| 4,918,521 | 4/1990 | Yabe | 358/98 |
| 4,930,861 | 6/1990 | Okabe | 358/901 |

FOREIGN PATENT DOCUMENTS

| | | |
|---|---|---|
| 68547 | 11/1957 | France . |
| 52-32224 | 11/1977 | Japan . |
| 55-38549 | 3/1980 | Japan . |
| 59-126378 | 7/1984 | Japan . |
| 63-209288 | 8/1988 | Japan . |

Primary Examiner—Paul M. Dzierzynski
Assistant Examiner—James Phan
Attorney, Agent, or Firm—Cushman, Darby & Cushman

[57] ABSTRACT

An image pickup device using a solid-state image sensor adapted to provide an optical component having a multiple curved surface, polyhedral surface, symmetric cylindrical surface, axially symmetric aspherical surface or asymmetric refracting surface in an objective lens system, or lengthen a shape of an image formed on an exit end face of an illuminating optical system in a direction parallel to a scanning direction of the solid-state image sensor, or select an angle made by a line segment connecting between the centers of individual exit end faces of two illuminating optical systems with the scanning direction of the solid-state image sensor to ±40° or less, or extend a shape of an aperture of a stop in a direction parallel to the scanning direction of the solid-state image sensor, in order to make it possible to fabricate the device in a small size and at a low cost and eliminate moire and false color without reducing resolving power.

7 Claims, 10 Drawing Sheets

FIG. 27 ns with the scanning direction of the solid-state image sensor; or the size of a stop is lengthened in a direction parallel to a scanning direction of a solid-state image sensor. Thereby, the moire and false color can be removed from the picture image without use of the optical low-pass filter.

IMAGING SYSTEM HAVING A BLURRING OPTICAL ELEMENT FOR MINIMIZING MOIRE PHENOMENON

This is a division of application Ser. No. 07/511,356, filed Apr. 12, 1990, which was a continuation-in-part of application Ser. No. 07/159,921 filed Feb. 24, 1988, now abandoned.

BACKGROUND OF THE INVENTION a) Field of the Invention

The present invention relates to an image pickup device forming an object image on a solid-state image sensor through an objective lens.

b) Description of the Prior Art

Figure 1:
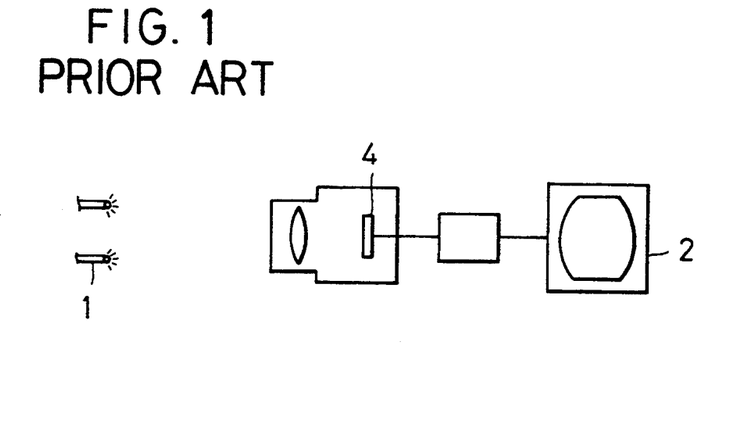
FIG. 1 is a view showing a basic arrangement of a camera apparatus using a solid-state image sensor.
Figure 2:
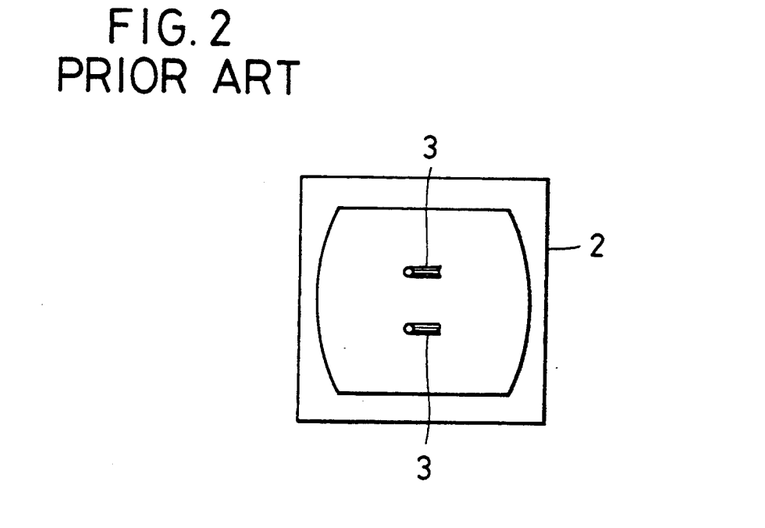
FIG. 2 is a view showing a display of false color in the camera apparatus shown in FIG. 1.

Generally, in an image pickup device provided with an image pickup portion adapted to secure a picture signal by arranging regularly pixel elements on a light receiving surface to space-sample two-dimensionally an object image as in solid-state image sensors represented by CCD image sensors, MOS image sensors, etc., when fine stripe regularly arranged and the like is photographed, the stripes interfere with the pixel elements, in a regular disposition, of the solid-state image sensor (in other words, a spatial frequency part of the objective image beats sampling frequency of the image pickup image sensor) and thereby moire, that is, a rough stripe pattern is liable to be displayed on the screen of a TV monitor. Also, in an image sensor provided with a color stripe filter or a color mosaic filter in front of the light receiving surface thereof, if a high spatial frequency part of the spectrum such as a minute bright spot and a clear boundary between bright and dark portions is included in an object, the high spatial frequency part of the spectrum is folded into a frequency region less than Nyquist rate of the image sensor when such spot and boundary are picked up, and thereby, as shown in FIG. 2 (which shows the case where bright spots are provided in the object), the bright spots are displayed as false signals (the so-called aliasing) with colored trails 3 on the screen of a TV monitor 2. In order to eliminate these defects, an arrangement has been made in the past so that an optical low-pass filter comprising a quartz plate and the like is provided in front of a solid-state image sensor 4 shown in FIG. 1. However, various problems have arisen that the quartz plate is high in cost and the arrangement of the optical low-pass filter needs a large space in an optical system.

SUMMARY OF THE INVENTION

In view of the above problems, it is the object of the present invention to provide an image pickup device of the type which is compact and low in cost and which can eliminate moire and false color without reducing resolving power.

In the image pickup device according to the present invention, an arrangement is such that: one of a multiple curved surface, polyhedral surface, symmetric cylindrical surface, axially symmetric aspherical surface, and asymmetric refracting surface is included in an objective lens system; or the contour of an image of the exit end face of an illuminating optical system is lengthened in a direction parallel to a scanning direction of a solid-state image sensor; or an illuminating optical system is divided into two systems to make an angle of ±40° or less by a straight line connecting between the centers of the exit end faces of both the illuminating optical systems with the scanning direction of the solid-state image sensor; or the size of a stop is lengthened in a direction parallel to a scanning direction of a solid-state image sensor. Thereby, the moire and false color can be removed from the picture image without use of the optical low-pass filter.

This and other objects as well as the features and advantages of the present invention will become apparent from the following detailed description of the preferred embodiments when taken in conjunction with the accompanying drawings.

DESCRIPTION OF THE PREFERRED EMBODIMENTS

Based on individual embodiments shown in the drawings, the present invention will be described in detail below.

Figure 3:
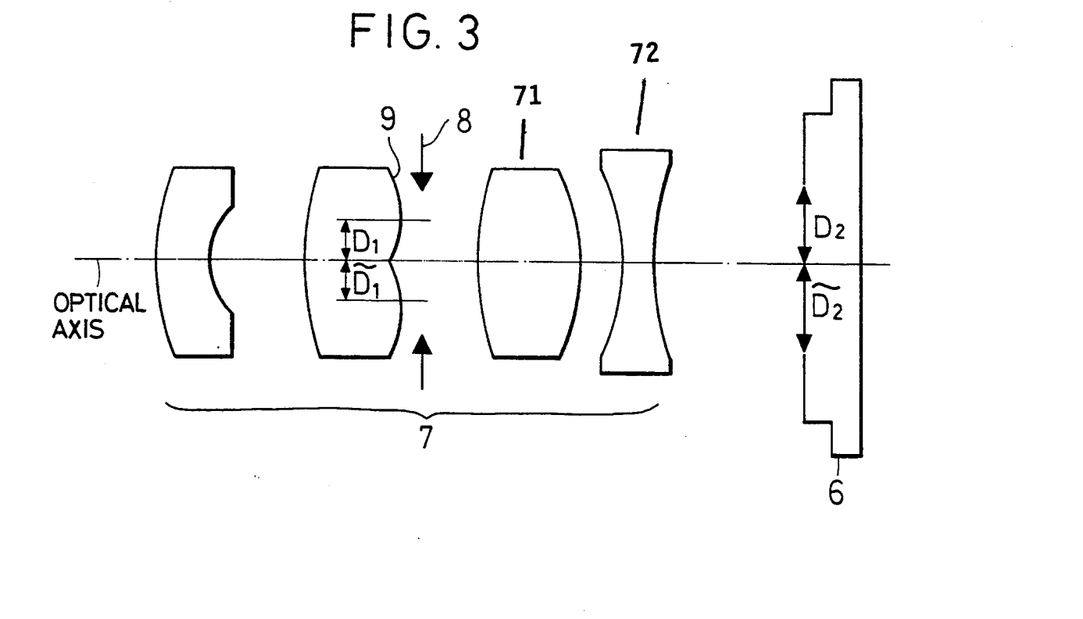
FIG. 3 is a view showing a first embodiment of an image pickup device according to the present invention.
Figure 4:
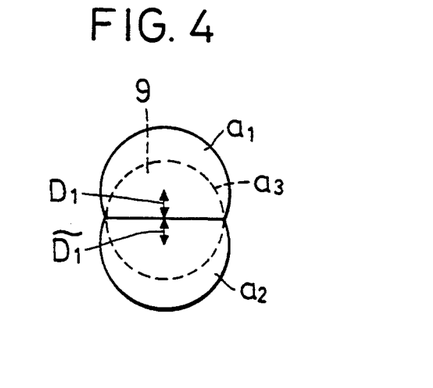
FIG. 4 is a front view of a lens having a multiple curved surface used in the first embodiment.

FIG. 3 shows a first embodiment of an image pickup device according to the present invention, in which reference numeral 7 designates an objective lens system for forming an image of an object not shown and 6 designates a solid-state image sensor receiving the image formed through the objective lens system to convert it into a picture signal. Further, of plural lens components constituting the objective lens system 7, a lens component 9 nearest to an aperture stop 8 is configured as a lens with a multiple curved surface. This multiple curved surface 9 has such shape that, as shown in FIG. 4, two spherical lenses $a_1$, $a_2$ are cut off at the sides to be joined to each other and the joined lens is ground into a circle taking a joined line as its diameter, as indicated by a broken line $a_3$. Now, when the amounts of decentering of the two spherical surfaces are $D_1$ and $\widetilde{D}_1$ the magnification of the multiple curved surface 9 in the case where the decentering of the two spherical surface is removed is $\beta_1$, and the magnification of an optical system (excluding the multiple curved surface 9) located to the rear of the multiple curved surface 9 (that is, on the side of the solid-state image sensor), that is, composite magnification of lenses 71, 72 is $\beta_2$, a twin image shifted for a distance $D_2 + \widetilde{D}_2$ is formed on the solid-state image sensor 6. In this case, individual distances $D_2$, $\widetilde{D}_2$ are given by the following formulas:

$$D_2 = |2(\beta_1 - 1)\beta_2 D_1| \quad (1)$$

$$\widetilde{D}_2 = |2(\beta_1 - 1)\beta_2 \widetilde{D}_1| \quad (2)$$

Therefore, this has an effect similar to that of the case where an optical low-pass filter comprising a birefringent monocrystalline plate such as a quartz plate is disposed in an optical system to form the twin image and the objective lens 7 forms an image pickup lens with an effect for a spatial frequency filter which has a point where an MTF (modular transfer function) becomes zero, that is, with a low-pass filter effect, in the formula $$f_c \text{ (spatial frequency)} = \frac{1}{2(D_2 + \widetilde{D}_2)} \quad (3)$$

Also, if the dimensions of one pixel element of the solid-state image sensor 6 are taken as $P_x$ (in a horizontal direction) and $P_y$ (in a vertical direction), when they are expressed approximately by the formulas $$\frac{P_x}{4} \leq D_2 + \widetilde{D}_2 \leq 4P_x \quad (4)$$

-continued $$\frac{P_y}{4} \leq D_2 + \widetilde{D}_2 \leq 4P_y \quad (5)$$

they have sufficient values for the elimination of moire and false color. Then, it is desirable to select the amount of separation in such a manner as to satisfy formula (4) when the twin image is formed in a horizontal direction and formula (5) when it is formed in a vertical direction. This is because, when the dimensions of one pixel element are $P_x$ and $P_y$, Nyquist rates in the sampling of the solid-state image sensor in horizontal and vertical directions are $$\frac{1}{2P_x} \text{ and } \frac{1}{2P_y},$$

respectively, so that it is effective for the elimination of moire that a point where the MTF of the objective lens determined from formula (3) becomes zero is accommodated in the range determined properly in accordance with the spectrum of the spatial frequency of an object to be photographed, taking the Nyquist rate as a base. Further, as in the case where a TV camera is mounted to the eyepiece section of an endoscope, when such a considerably regular arrangement as the exit end face of an image guide fiber bundle is provided in an object image, the moire and false color can be removed from the image if the spatial frequency is selected to be expressed, with respect to a repeated frequency $f_B$ of the regular arrangement, by the formula $$f_C \doteq f_B \quad (6)$$

Also, it is not always necessary that the multiple curved surface 9 is formed to be symmetric with regard to an optical axis, and as such it brings about the same effect even if $D_1 \neq \widetilde{D}_1$. Moreover, in accordance with aberration correction and other necessity, individual curved surfaces constituting the multiple curved surface 9 can also be configured as aspherical surfaces.

Figure 5:
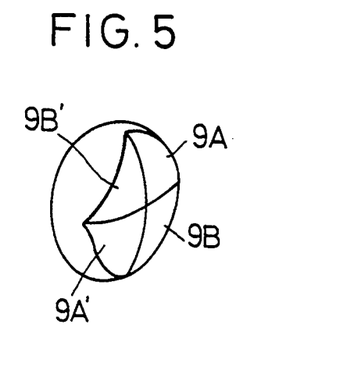
FIG. 5 is a perspective view showing another example of a lens having a multiple curved surface.
Figure 6:
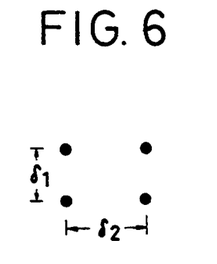
FIG. 6 is a view showing the arrangement of images split by the lens shown in FIG. 5.
Figure 7:
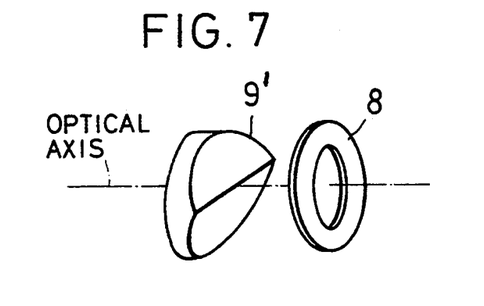
FIG. 7 is a perspective view showing still another example of a lens having a multiple curved surface.

Further, in the case where the solid-state image sensor 6 is provided with a color coded filter, if the dimensions $P_x$, $P_y$ are considered in such a manner as to coincide with the repeated pitches of individual color components of the color coded filter, moire and the like caused by the interference of the color sampling frequency with the spatial frequency of an object can be removed. Although this embodiment is adapted to form the twin image through the multiple curved surface 9 provided in the vicinity of the stop 8, a plurality of lens surfaces may also be formed as the multiple curved surface, without any limitation on the above description, to separate a multiple image in some different direction. Also, if, for example, two lenses with the multiple curved surface 9 are provided in such a manner that the joined lines of the multiple curved surfaces intersect with each other at right angles, a quadruple image separated in two directions intersecting with each other at right angles is available. In such a case, formulas (4) and (5) are satisfied at the same time and an effect that the spatial frequency response is controlled in both the horizontal and vertical directions is brought about. FIG. 5 shows another example of the multiple curved surface, which comprises four decentering surfaces combined with each other so that an image can be separated into four points. FIG. 6 shows the preceding separated images, in which respective amounts of decentering of curved surfaces 9A, 9A'; 9B, 9B' opposite to each other are varied to thereby enable separating amounts $\delta_1$, $\delta_2$ to be arbitrarily changed. FIG. 7 shows an example of a polyhedron. This example makes use of a polyhedral surface, in place of the multiple curved surface 9, in which a surface of an optical element 9' is formed in a roof shape by jointing plane surfaces different from each other in inclination. An edge line of this roof-shaped surface assumes a straight line including an optical axis. Thus, according to the present invention, as mentioned above, a desired multiple image can be formed by merely shaping the surface of a portion of a lens required for the image formation of the objective lens into the multiple curved surface or the polyhedron, without using a birefringent filter or the like which needs space, and a favorable picture image free of moire and false color is available.

Figure 8:
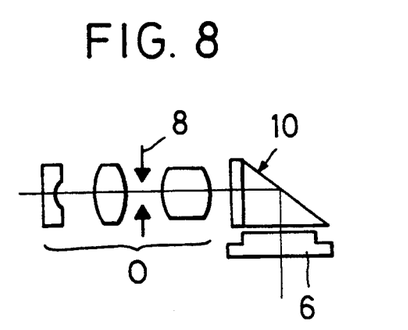
FIG. 8 is a view showing a second embodiment of the image pickup device according to the present invention.
Figure 9:
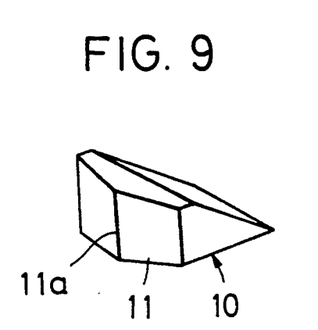
FIG. 9 is a perspective view of a prism used in the second embodiment.

FIG. 8 shows a second embodiment, in which a rectangular prism 10 is arranged at the rear of an objective lens system O in an electronic endoscope and thereby the solid-state image sensor 6 is disposed along a longitudinal direction of the endoscope. Here, the entrance face of the prism 10 forms a roof-shaped face 11 taking a straight line 11a making a right angle with an optical axis as an edge, as shown in FIG. 9, and the prism 10 has a function of forming the twin image in the same manner as in the polyhedral lens shown in FIG. 7.

Figure 10:
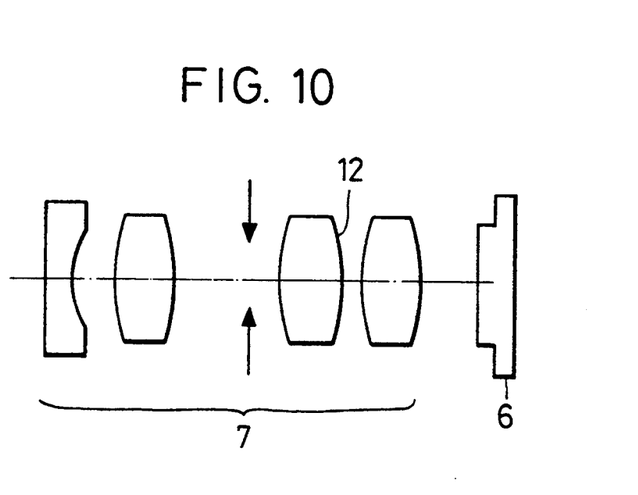
FIG. 10 is a view showing a third embodiment of the image pickup device according to the present invention.
Figure 11:
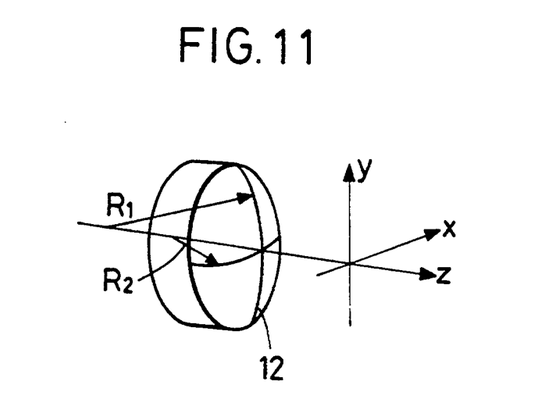
FIG. 11 is a perspective view of a lens, having a toric surface, used in the third embodiment.
Figure 12:
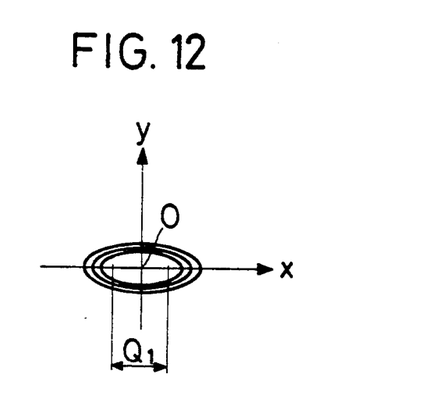
FIG. 12 is a view showing contour lines of a point spread function caused by the lens shown in FIG. 11.

FIG. 10 shows a third embodiment, in which a lens with a toric surface 12 is arranged in the objective lens system 7 so that a point spread function on an image surface is lengthened in shape in one direction. When the lens is configured in such a manner, it brings about the same effect as in the case where a birefringent filter serving to separate an image in the above direction is disposed in an optical path and makes it possible to eliminate moire and false color. Also, the toric surface means a surface having radii of curvature $R_1$, $R_2$ different in accordance with directions as indicated in FIG. 11. FIG. 12 shows contour lines of the point spread function caused by the objective lens system 7 of the third embodiment. In this instance, the radius of curvature $R_1$ has a value suitable for an original image formation, while $R_2$ has a value different from $R_1$, with the result that the point spread function is lengthened in the x direction. Also, it is only necessary to arrange the toric lens in such a manner as to fit the x direction to a horizontal scanning direction if the spatial frequency response has to be controlled in the horizontal scanning direction and to incline the x direction with respect to horizontal and vertical directions if the spatial frequency response needs to be controlled in both the directions. Otherwise, two toric surfaces may also be provided in such a way that the directions in which point spread function extends intersect with each other.

Figure 13:
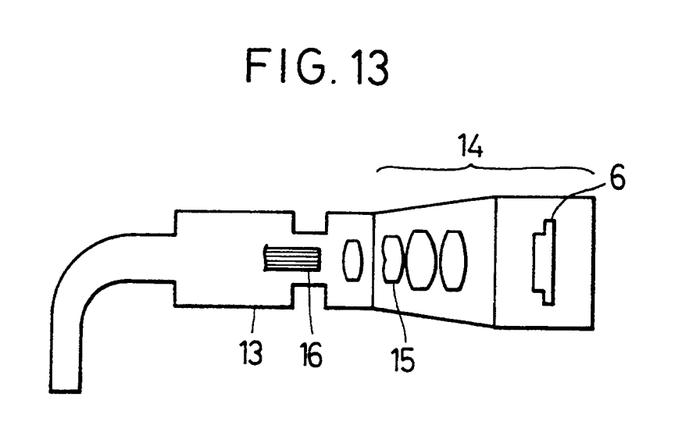
FIG. 13 is a view showing a fourth embodiment of the image pickup device according to the present invention.
Figure 14:
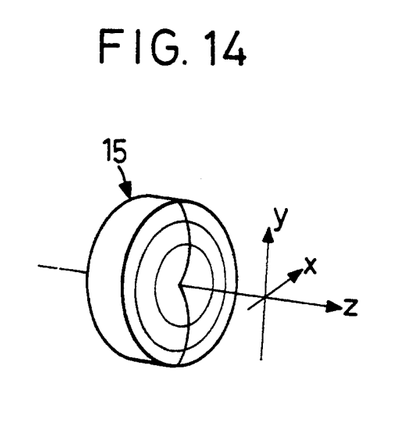
FIG. 14 is a perspective view of a rotary cylindrical lens used in the fourth embodiment.
Figure 15:
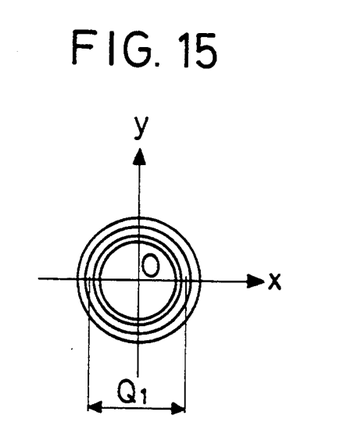
FIG. 15 is a view showing contour lines of a point spread function caused by the rotary cylindrical lens shown in FIG. 14.
Figure 16:
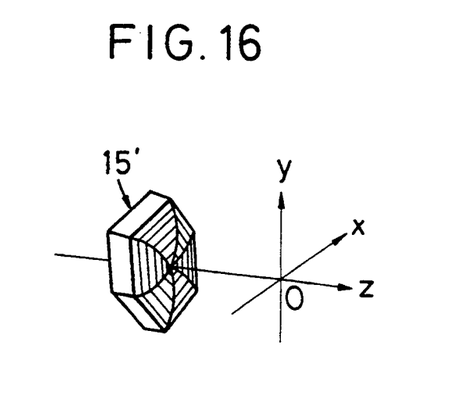
FIG. 16 is a perspective view showing another example of a rotary cylindrical lens used in the fourth embodiment.
Figure 17:
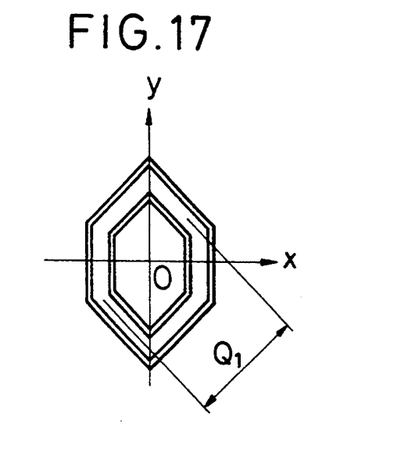
FIG. 17 is a view showing contour lines of a point spread function caused by the rotary cylindrical lens shown in FIG. 16.

FIG. 13 shows a fourth embodiment, which is an instance that, in a TV camera 14 attached to a fiber scope 13, a rotary cylindrical lens 15 is provided in a photographing lens system. The rotary cylindrical lens 15, as depicted in FIG. 14, has a rotary symmetric curved surface, with a recessing center, formed by rotating a portion of a circle, ellipse or the like about the optical axis and assumes such a sectional shape as shown in FIG. 13. The point spread function is formed in a ring shape by the peak of intensity as indicated by the contour lines in FIG. 15. FIG. 16 is an instance of a symmetric cylindrical lens 15' having a surface in the shape joined so that 6-fold rotation symmetry is obtained when a cylindrical lens is rotated around the optical axis. In such a case, the point spread function has the peak of intensity in an equilateral hexagonal shape as shown in FIG. 17. In these instances, moire in the fiber scope 13 can be completely eliminated when the frequency of the arrangement of fibers in an image on the end face of an image guide fiber bundle 16 which is formed on the image sensor through the objective lens system is represented as $f_B$ and $$Q_1 \approx \frac{1}{2f_B} \qquad (7)$$

where $Q_1$ is the size of a spot observed at the point that the intensity becomes about ½ of the peak in the instance of FIG. 12 and is the space of the peak exhibited by the point spread function in FIGS. 15 and 17.

Further, the symmetry of the symmetric cylindrical lens can be selected for use in various shapes so as to be not only 6-fold rotation symmetry, but 2- or 3-fold rotation symmetry. Also, the toric lens 12 has an effect on the limitation of the spatial frequency response in one direction, whereas the rotary cylindrical lens 15 or the symmetric cylindrical lens 15' has isotropy or multi-directional properties and therefore it is desirable to determine what type of lens should be employed in accordance with an object to be photographed, the arrangement of pixel elements of the solid-state image sensor, the pattern of a color filter, etc.

Figure 18A:
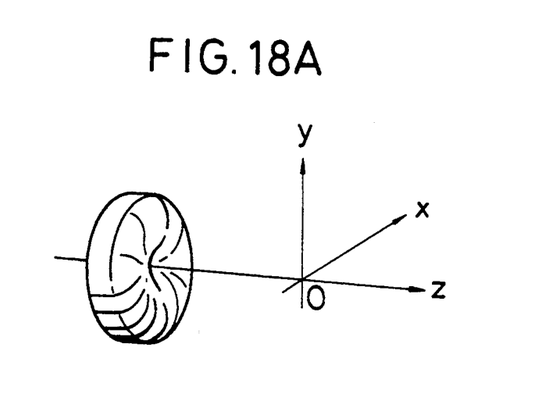
FIGS. 18A and 18B are a perspective view and a side view, respectively, showing a further example of a lens having a multiple curved surface which is used in the first embodiment.
Figure 18B:
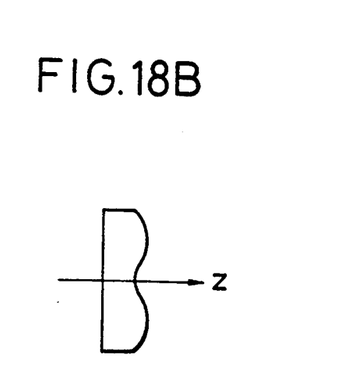
Figure 19:
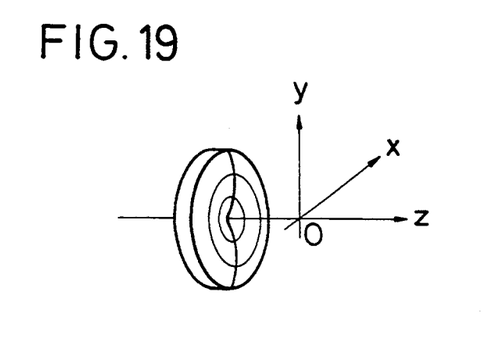
FIG. 19 is a perspective view showing still another example of a rotary cylindrical lens used in the fourth embodiment.

Further, although the jointed portions of individual surface elements (individual curved surfaces or plane surfaces) constituting the multiple curved surface, polyhedral surface and symmetric cylindrical surface in the examples of FIGS. 4, 5, 7, 9 and 16 are pointed, these portions may also be made smooth to facilitate the fabrication or may also be utilized for aberration correction or for controlling the shape of the point spread function. FIGS. 18A and 18B are an example of the symmetric cylindrical surface in which the jointed portions are made smooth. In the example of FIG. 14, in which the center portion of the lens surface is pointed (sinks), the center portion can also be made dull as shown in FIG. 19 to bring about the same effect as in the example shown in FIGS. 18A and 18B. Also, in addition to the ways described above, various multiple curved surfaces, polyhedral surfaces and rotary cylindrical lenses are used to vary the shape of the point spread function and thereby a low-pass effect can be achieved. Then, the lenses including these surfaces can be made at a low cost by such a way as press forming or mold forming. Further, some spherical or aspherical lenses may also be cut into arcs or segments, which are joined to each other, to make such lenses having the curved surfaces as in FIGS. 4, 5 and 7. It is desirable that the surfaces giving the multiple image and blur as in the foregoing are each arranged at a position such as not to be so spaced from the stop provided in the objective lens system 7. This is because, if the surface is so spaced from the stop, an on-axial light beam and an off-axial light beam which are transmitted through the stop will separate spatially from each other and therefore the multiple image of the same object point cannot be formed on the image surface. Accordingly, it is good practice to locate each surface at a position close to the stop to such an extent that the on-axial light beam and the off-axial light beam do not separate spatially from each other, specifically, at a position such as to satisfy the condition:

$$|he/hm| \leq 1$$

where hm is the height of an on-axial marginal ray in the multiple curved surface, symmetric cylindrical surface, asymmetric aspherical surface and asymmetric refracting surface and he is the height of an off-axial principal ray of the maximum field angle in the multiple curved surface, symmetric cylindrical surface, asymmetric aspherical surface and asymmetric refracting surface.

Usually, a lens satisfying the preceding condition may often be disposed at the position of up to the second lens from the stop.

Figure 20:
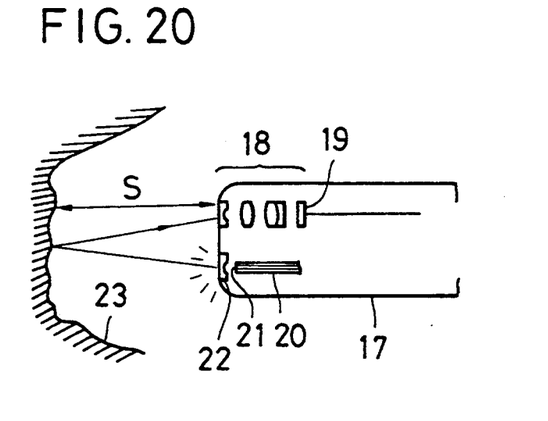
FIG. 20 is a view showing a fifth embodiment of the image pickup device according to the present invention.
Figure 21:
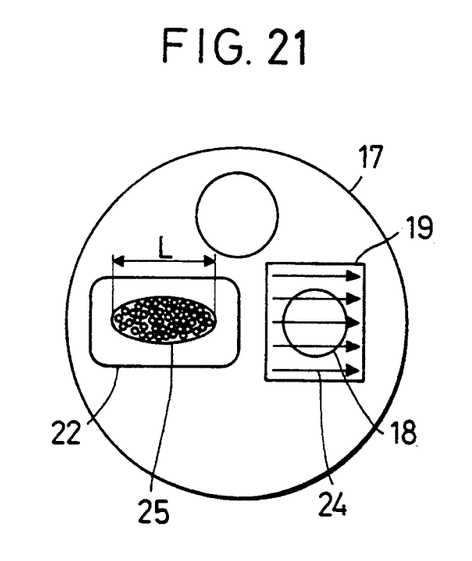
FIG. 21 is a front view of the fifth embodiment viewed from the object side.
Figure 22:
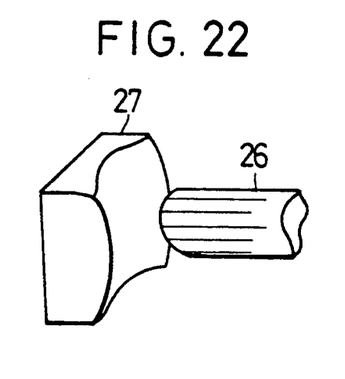
FIGS. 22 and 23 are views showing an example of the fifth embodiment in which an image of the end face of a light guide is elongated in one direction.
Figure 23:
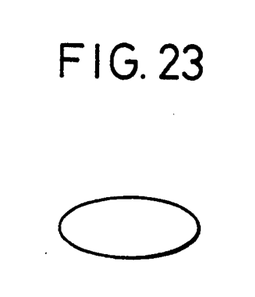

Next, an embodiment which is effective for the elimination of a false signal caused by considerable variation of luminance on an object to be photographed will be explained in the following. FIGS. 20 and 21 shows a fifth embodiment. FIG. 20 is a sectional side view of the distal end portion of an endoscope 17 and FIG. 21 is a front view of the endoscope viewed from the object side, which are drawn somewhat illustratively for convenience of explanation. In these figures, reference numeral 18 designates an objective lens system, and a solid-state image sensor 19 arranged in the rear of the objective lens system is provided with a so-called mosaic filter on the entrance side of thereof. Also, an exit end face 21 of a light guide 20 for illumination and a lens 22 for illumination are formed into an ellipse and a rectangle, respectively. Here, light emitted from the light guide 20 reaches an object 23 through the lens 22 for illumination and the light reflected from the object is formed as a bright spot image through the objective lens system 18 onto the solid-state image sensor 19, resulting in false color. In the present invention, however, as shown in FIG. 21, the arrangement is such that a scanning direction 24 (i.e. a direction of the trail of false color: the same applies to other embodiment described below) of the solid-state image sensor 19 is parallel to a longitudinal direction of an image 25 of the illuminating light exit end face 21 of the light guide 20 by the illuminating lens 22. Also, FIG. 21 is a view of the electronic endoscope viewed from the object side. When the components of the endoscope are arranged in such a manner, the bright spot image reflected from the object 23 is formed in a long spread shape in the scanning direction on the solid-state image sensor 19, so that it brings about the same effect as in the case where the twin image is substantially formed through the birefringent filter. Also, in a colored solid-state image sensor of a line sequential system of color difference, the direction of the trail of false color coincides, in most cases, with the scanning direction of the solid-state image sensor corresponding to the scanning direction of a TV monitor. The trail of false color may also be laid in two directions or more or in a horizontal, vertical or oblique direction, depending on the color distribution and arrangement of the mosaic filter and the way of reading out a signal. Further, in order to form the image 25 on the illuminating light exit end face 21 of the light guide 20 into not a circle, but a rectangle or an ellipse with major and minor axes, the illuminating light exit end face 21 per se of the light guide 20 may also be constructed to be rectangular or elliptic, or, as shown in FIG. 22, an illuminating lens 27 having the toric surface may also be arranged in front of a light guide 26 which is round, square, rectangular or elliptic in section so that the shape of the image of the exit end face of the light guide 26 is lengthened in one direction as shown in FIG. 23.

Figure 24:
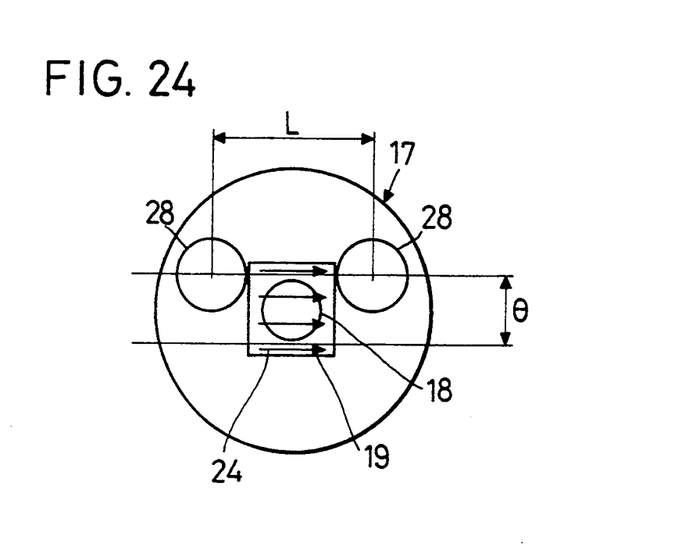
FIG. 24 is a front view of a sixth embodiment, viewed from the object side, of the image pickup device according to the present invention.

FIG. 24 shows a sixth embodiment and is a front view of the endoscope viewed from the object side as in FIG. 21. In this instance, two light guides 28 are disposed and the arrangement is such that an angle $\theta$ made by a straight line connecting between the centers of the two light guides 28 with the scanning direction 24 of the solid-state image sensor 19 is $\pm 40°$ or less. As a result of such an arrangement, the bright spot image formed on the solid-state image sensor 19 is replaced by two dots per pair and consequently false color is diminished with the fact that the same effect as in the birefringent filter is secured. Also, when L is the longitudinal length of the image 25 in FIG. 21 or the distance between the two illuminating light guides 28, 28 in FIG. 24, S is the distance from the tip portion of the electronic endoscope 17 to the object 23, and f is the focal distance of the objective lens system 18, the longitudinal length of the bright spot image formed on the solid-state image sensor 19 or the space between the images formed on the exit end faces of the two illuminating light guides 28, 28 is given, as $\overline{L}$, by the following formula:

$$\overline{L} = \frac{f \cdot L}{2 S} \tag{8}$$

Further, when P is the vertical or horizontal pitch of one pixel element of the solid-state image sensor 19 or the repetition of individual color components of the color coded filter, the elimination of false color needs the length $\overline{L}$ to be determined approximately from the formula $$\frac{P}{4} \leq \overline{L} \leq 4P \tag{9}$$

On the other hand, in the electronic endoscope 17, the object distance is varied as expressed by $$0.0025 \leq \frac{f}{2S} \leq 0.25 \tag{10}$$

and therefore, by substituting formula (8) for formula (9) in view of formula (6), an effect is brought about when $$P \leq L \leq 1600\,P \tag{11}$$

Figure 25A:
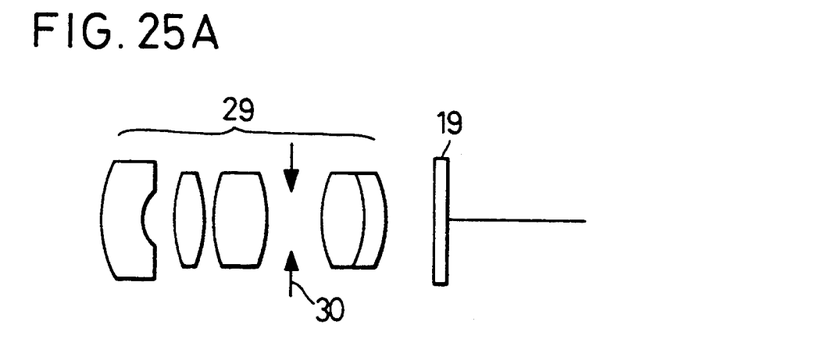
FIG. 25A is a view showing a seventh embodiment of the image pickup device according to the present invention.
Figure 25B:
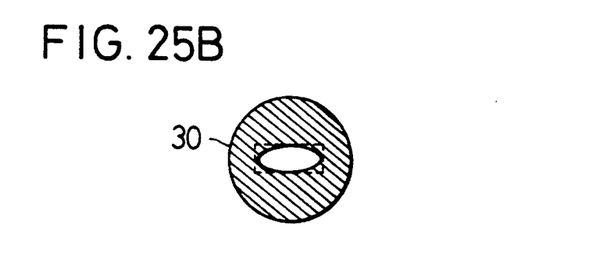
FIG. 25B is a front view showing an example of a stop used in the seventh embodiment.

FIGS. 25A and 25B show a seventh embodiment, in which a stop 30 disposed in an objective lens system 29 of an electronic endoscope is configured not in a circle, but in lateral extension such as an ellipse (solid line) and a rectangle (dotted line), along the scanning direction 24 of the solid-state image sensor 19. Alternatively, two circles may also be arranged in the scanning direction. When the arrangement is made in this manner, a bright spot is formed to be extended in a longitudinal direction of the solid-state image sensor 19 in out-of-focus, so that false color can be decreased. Otherwise, if the stop is formed substantially in the same shape as one pixel element of the solid-state image sensor, a depth of field is advantageously obtained to be most sufficient.

Figure 26:
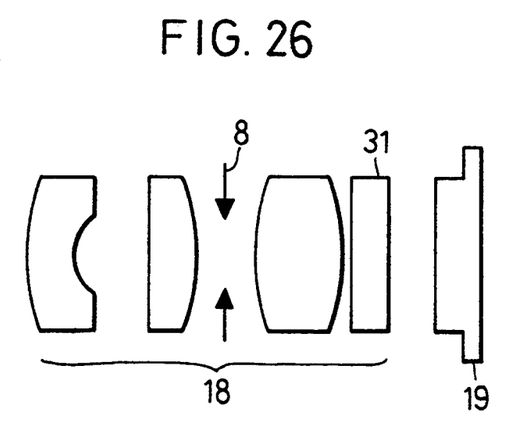
FIG. 26 is a view showing an eighth embodiment of the image pickup device according to the present invention.
Figure 27:
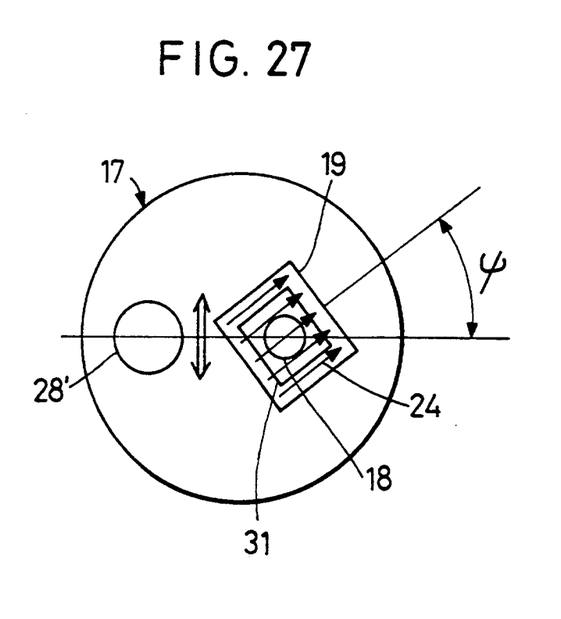
FIG. 27 is a front view of the eighth embodiment viewed from the object side.

FIGS. 26 and 27 show an eighth embodiment. In this instance, an image pickup system is provided with an optical low-pass filter 31 comprising a member having such birefringence as in a quartz plate between the objective lens system 18 and the solid-state image sensor 19 as shown in FIGS. 26 and 27. In FIG. 27, in which reference numeral 28' represents an illuminating optical system juxtaposed in the image pickup system, this instance is adapted to provide an angle $\psi$ made by a line connecting between the centers of the illuminating optical system 28' and the objective lens system 18 with a separating direction of an image resulting from the birefringence of the optical low-pass filter 31, as will be obvious from the figure, to satisfy the formula $$30° \leq |\psi| \leq 60° \tag{12}$$

and is adapted to dispose the solid-state image sensor 19 with respect to the objective lens system 18 as shown in FIG. 27 so that the separating direction of the twin image is virtually parallel to the scanning direction of the solid-state image sensor 19. Thus, even through light emitted from the illuminating optical system 28' reaches an object and is polarized in the direction of the arrow indicated in FIG. 27, the polarized light is incident at an angle of 45° to the separating direction, with the result that a separating image of the twin image formed through the birefringent filter 31 is substantially the same in intensity and an effect for the low-pass filter reaches a maximum.

What is claimed is:

1. An imaging system for minimizing moire phenomenon comprising:
    an imaging lens unit for forming an image of an object at a predetermined imaging position, said imaging lens unit including an optical element on an optical path from a front end of said imaging lens unit to said predetermined imaging position;
    one of an entrance face and an exit face of said optical element having a surface shape selected from a group consisting of a rotary cylindrical surface and a symmetric cylindrical surface which provides blurring exhibited in one of zonal and annular shapes with respect to said image of said object at said predetermined imaging position.

2. An imaging system according to claim 1, wherein said one of zonal and annular shapes is polygonal.

3. An imaging system according to claim 1, wherein said one of zonal and annular shapes is circular.

4. An imaging system according to claim 1, further including a solid-state image sensor disposed at said predetermined imaging position.

5. An imaging system for minimizing moire phenomenon comprising:
    an image guide fiber bundle;
    an imaging lens unit for re-forming an image appearing at an end face of said image guide fiber bundle on a predetermined imaging position, said imaging lens unit including an optical element on an optical path from a front end of said imaging lens unit to said predetermined imaging position, one of an entrance face and an exit face of said optical element having a surface shape which provides blurring exhibited at one of zonal and annular shapes to the image re-formed on said predetermined imaging position; and
    a solid-state image sensor placed on said predetermined imaging position;
    wherein the condition:

$$Q_1 \div \tfrac{1}{2} f_B$$

is satisfied where $Q_1$ represents a space between peaks of intensity of a point spread function, according to which said blurring is formed, in one of a horizontal direction and a vertical direction, and $f_B$ is a frequency of arrangement of fibers in the image appearing at said end face of said image guide fiber bundle which is re-formed on said image sensor through said imaging lens unit.

6. An imaging system for minimizing moire phenomenon comprising:
    an imaging lens unit for forming an image of an object at a predetermined imaging position, said imaging lens unit including an optical element on an optical path from a front end of said imaging lens unit to said predetermined imaging position, one of an entrance face and an exit face of said optical element having a surface shape formed as a rotary cylindrical surface so as to provide blurring exhibited at one of zonal and annular shapes to the image of the object in said predetermined imaging position; and
    a solid-state image sensor disposed on said predetermined imaging position.

7. An imaging system for minimizing moire phenomenon comprising:
    an imaging lens unit for forming an image of an object at a predetermined imaging position, said imaging lens unit including an optical element on an optical path from a front end of said imaging lens unit to said predetermined imaging position, one of an entrance face and an exit face of said optical element having a surface shape formed as a symmetric cylindrical surface so as to provide blurring exhibited at one of zonal and annular shapes to the image of the object in said predetermined imaging position; and
    a solid-state image sensor disposed on said predetermined imaging position.

* * * * *